United States Patent [19]
Tomita

[11] Patent Number: 4,644,799
[45] Date of Patent: Feb. 24, 1987

[54] ELECTROMAGNETIC FLOW METER

[75] Inventor: Toyofumi Tomita, Tokyo, Japan

[73] Assignee: Kabushiki Kaisha Toshiba, Kawasaki, Japan

[21] Appl. No.: 770,586

[22] Filed: Aug. 29, 1985

[30] Foreign Application Priority Data

Sep. 7, 1984 [JP] Japan .............................. 59-187577

[51] Int. Cl.⁴ .............................................. G01F 1/60
[52] U.S. Cl. ................................ 73/861.12; 73/861.17
[58] Field of Search ........... 73/861.12, 861.13, 861.16, 73/861.17

[56] References Cited

U.S. PATENT DOCUMENTS 3,965,738 6/1976 Watanabe ......................... 73/861.17
4,206,641 6/1980 Takada .
4,382,387 5/1983 Hafner .

Primary Examiner—Herbert Goldstein
Attorney, Agent, or Firm—Oblon, Fisher, Spivak, McClelland, & Maier

[57] ABSTRACT

A square wave excitation current is supplied to an excitation coil. A magnetic field generated in this coil is impressed on an electrically conductive fluid. The voltage induced in the electrically conductive fluid is drawn out as a flow rate signal by means of a pair of electrodes. The issue of the flow rate signal is delayed by the sample hold circuit to an extent corresponding to half the period of the flow rate signal. A differential amplifier determines a difference between the level of the flow rate signal and that of the delayed signal. The noise component of the delayed signal is offset against the noise component of the flow rate signal, thus issuing a signal having a level corresponding the level difference. The flow rate of the electrically conductive fluid is determined from the level of an output signal from the differential amplifier.

15 Claims, 33 Drawing Figures

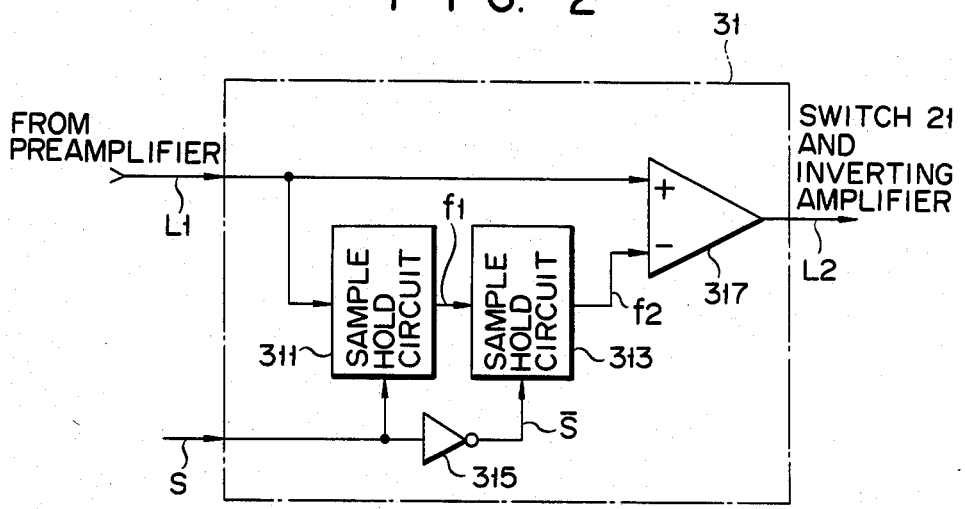
FIG. 2
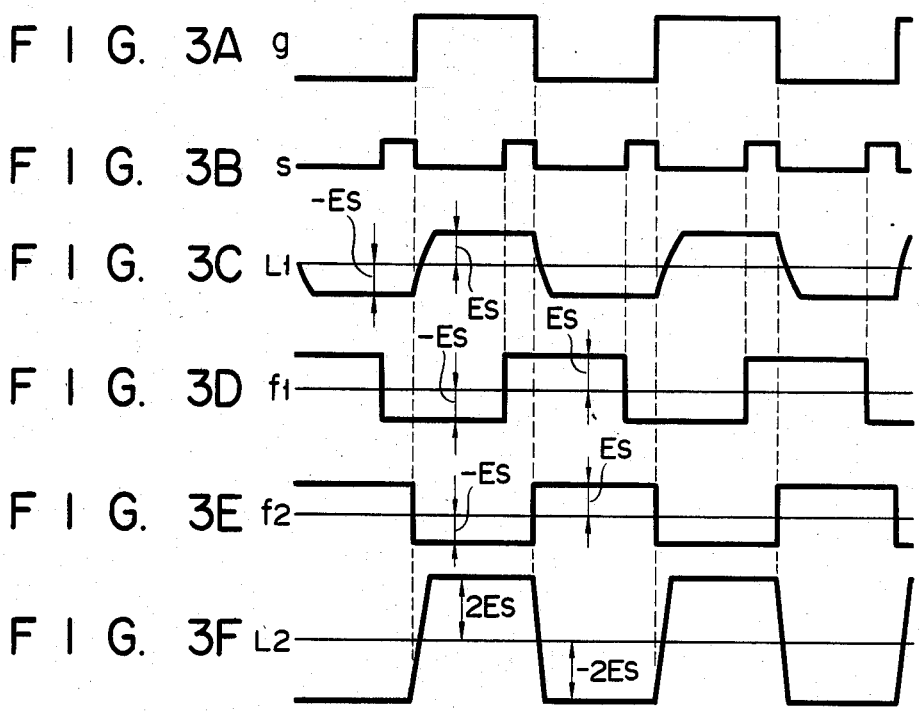
FIG. 3A g
FIG. 3B s
FIG. 3C L1
FIG. 3D f1
FIG. 3E f2
FIG. 3F L2

FIG. 5
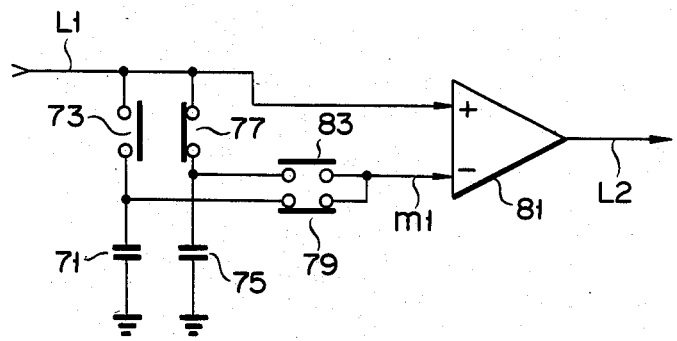
FIG. 6A g
FIG. 6B SW1,4
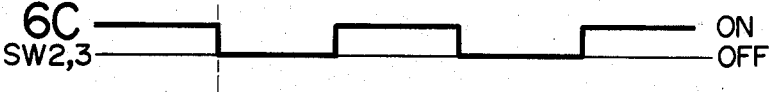
FIG. 6C SW2,3
FIG. 6D L1
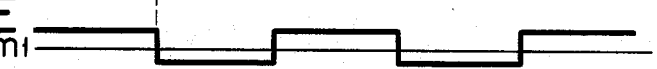
FIG. 6E m1
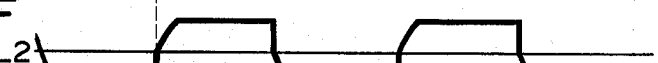
FIG. 6F L2

F I G. 7
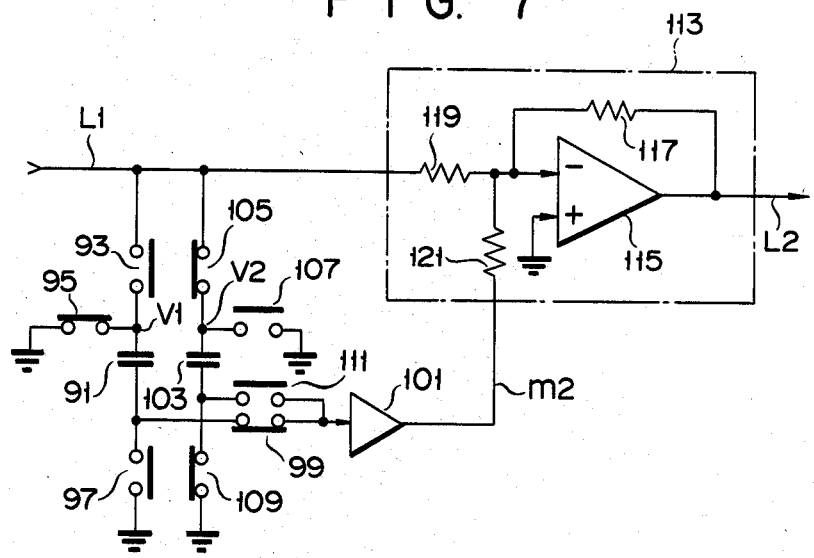
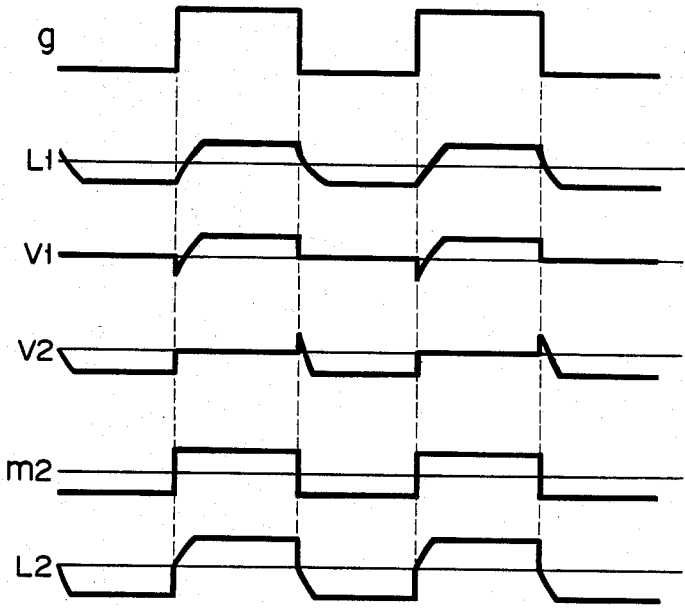
F I G. 8A g
F I G. 8B L1
F I G. 8C v1
F I G. 8D v2
F I G. 8E m2
F I G. 8F L2

F I G. 9
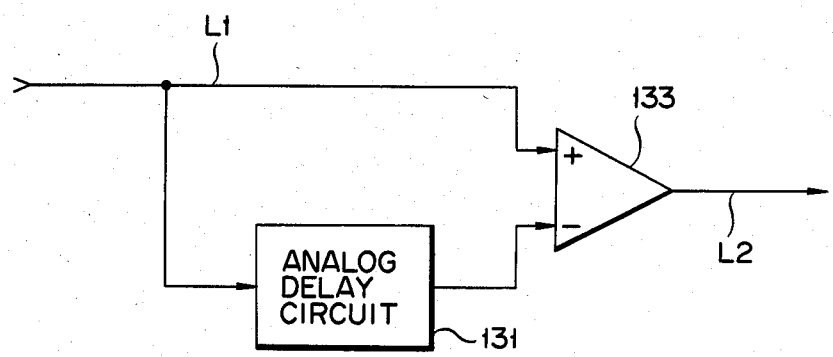

ELECTROMAGNETIC FLOW METER

BACKGROUND OF THE INVENTION

This invention relates to an electromagnetic flow meter little affected by noises, particularly electrochemical noises.

An electromagnetic flow meter known to date is, for example, the type of FIG. 1 of U.S. Pat. No. 4,206,641. This conventional electromagnetic flow meter comprises an electromagnetic flow meter detector (hereinafter referred to as "the detector") and an electromagnetic flow meter converter (hereinafter referred to as "the converter"). The detector consists of a pipe provided with a pair of electrodes and a pair of excitation coils set on both sides of the pipe. The converter is comprised of an amplifier, inversion type amplifier, integration circuit and control circuit.

The excitation coils are supplied with a square wave current which has the frequency of a commercial power source divided by an even number. As a result, the excitation coils generate a square wave magnetic field. When an electroconductive fluid, for example, city water or chemical, is conducted through the above-mentioned pipe, voltage is induced between the pair of electrodes according to Faraday's law, and the induced voltage is amplified to a prescribed level by the amplifier of the converter. The amplified voltage is then inverted.

The amplified voltage and inversion amplified voltage are alternately selected and converted into a signal of negative voltage. The signals of negative voltage are subjected to sampling at a prescribed time and delivered to the integration circuit. The integration circuit sends forth (outputs) a signal, obtained by the integration of the input signal, to the control circuit. The resultant pulse signal is smoothed to determine the flow rate of the subject fluid The conventional square wave excitation type electromagnetic flow meter performing the abovementioned operation offers the undermentioned advantages:

(1) A loop constituted by the electrodes and in which the amplifier the and fluid is essentially free from the occurrence of rectangular noises and noises of the same phase, thereby ensuring the issue of a stable output signal.

(2) The sampling of the flow rate signal is carried out per period of the frequency of a commercial power source, thereby eliminating the noises which are generated by the induction of the commercial power source (high resistance to noises).

(3) An amplified signal and inversion amplified signal are alternately sent forth, thereby effectively eliminating noises resulting from the DC component of, for example, the offset voltage of the amplifier and of an ultra-low frequency.

(4) Since various noises are effectively eliminated, a highly stable output signal can be issued, even if the excitation current is reduced in quantity and the flow rate signal is of a low level. Consequently, the above-mentioned conventional electromagnetic flow meter can be operated on little power, the electromotive force generated per unit flow rate in the aforesaid electrodes being reduced to a level as low as one-fifth to one-tenth of what is observed in an electromagnetic flow meter excited by a commercial power source.

One of the noises accompanying the conventional electromagnetic flow meter is of the electrochemical type. This electrochemical noise arises with ultra-low frequency when electric charges of the electrodes are moved by the ions of the aforementioned fluids. This electrochemical noise raises or drops the voltage induced across the paired electrodes. The electrochemical noise has a level varying with the component of the fluids and the material and surface condition of the paired electrodes. Particularly with respect to a slurry fluid, the electrochemical noise of the ultra-low frequency is indicated as being at a high level.

When the level of the noise falls below the level allowed by the converter, the electrochemical noise is eliminated by the converter, thereby preventing the measurement of the subject electromagnetic flow meter from being reduced in precision. Conversely, when the electrochemical noise has a higher level than permitted by the converter, an amplifier is set to operate in the saturation region in the converter, giving rise to irregular functions and noticeably decreasing the measurement precision. For instance, in the above-mentioned conventional electromagnetic flow meter, the electrochemical noise is of a sufficiently high level to cause an input signal to the integration circuit to be of a positive voltage, causing the control circuit to fail to perform a normal function. For the resolution of this problem, the conventional practice is to supply a negative bias voltage to the integration circuit to expand the range of stable operation. However, the impression of a bias voltage to the integration circuit leads to a reduction of the extent to which a flow rate signal can vary within the operational range of the integration circuit and, moreover, the noises of the integration circuit exert a more prominent effect in the later stage of the integration circuit. Consequently, the drift of the offset voltage of the integration circuit is, for example, enlarged, thus imposing limitations on the extent to which the bias voltage can be impressed.

Hitherto, therefore, a limiter circuit has been provided in the detector to eliminate electrochemical noises. This limiter circuit comprises Zener diodes connected together with their polarities reversed with respect to each other, and resistors connected in parallel with the Zener diodes. However, though the conventional electrochemical noise-eliminating process involving the limiter circuit can indeed restrict the occurrence of electrochemical noises, at the same time it also restricts the issue of a flow rate signal. Therefore, the conventional process can not yet be regarded as fully adapted to attain the intended object.

SUMMARY OF THE INVENTION

It is, accordingly, the object of this invention to provide an electromagnetic flow meter which can ensure elimination of even excessive electrochemical noises, and which can determine the flow rate of fluids with a sufficiently high degree of precision.

To attain the above-mentioned object, this invention provides an electromagnetic flow meter which comprises:

a flow meter main body (1) which supplies a square wave current to excitation coils (9a, 9b), impresses the generated magnetic field on an electrically conductive fluid, and draws out, in the form of a flow rate signal and by means of a pair of electrodes (5a, 5b), a voltage induced in said electrically conductive fluid;

delay means (311, 313) connected to the flow meter main body (1) for the purpose of delaying the received flow rate signal for a length of time equivalent to an integer multiple of half the period of said flow rate signal, and then outputting the delayed flow rate signal;

noise-eliminating means (317) which is connected to said flow meter body (1) and delay means (311, 313), and receives said flow rate signal and delayed signal, eliminates low frequency noise components included in said flow rate signal in accordance with the received delayed signal, and issues a signal corresponding to the flow rate signal from which said noise component has been eliminated; and means (15, 17, 27, 29, 33, 35, 37, 39) which are connected to said noise-eliminating means and determine the flow rate of an electrically conductive fluid in accordance with the contents of said signal corresponding to the noise-free flow rate signal.

The electromagnetic flow meter of this invention, constructed as described above, offers the advantages that noises included in a flow rate signal can be eliminated in accordance with the contents of a delayed flow rate signal; therefore, electrochemical noises can be removed with assurance even when generated in excessive amounts, the noises being eliminated before the flow rate determining means is supplied with an input signal, and the latter stage of the circuit arrangement being simplified, thereby elevating the precision with which the flow rate is determined.

BRIEF DESCRIPTION OF THE DRAWINGS

FIG. 2 sets forth the arrangement of the noise-eliminating circuit according to said first embodiment;

FIGS. 3A to 3F illustrate signal waveforms by way of indicating the operation of the noise-eliminating circuit of FIG. 2;

FIG. 5 indicates the arrangement of a noise-eliminating circuit according to a second embodiment of the invention;

FIGS. 6A to 6F indicate signal waveforms by way of describing the operation of the noise-removing circuit of FIG. 5;

FIG. 7 shows a noise-eliminating circuit according to a third embodiment of the invention;

FIGS. 8A to 8F set forth signal waveforms by way of describing the operation of the noise-removing circuit of FIG. 7; and FIG. 9 indicates the arrangement of a noise-eliminating circuit according to a fourth embodiment of the invention.

DETAILED DESCRIPTION OF THE PREFERRED EMBODIMENTS

Figure 1:
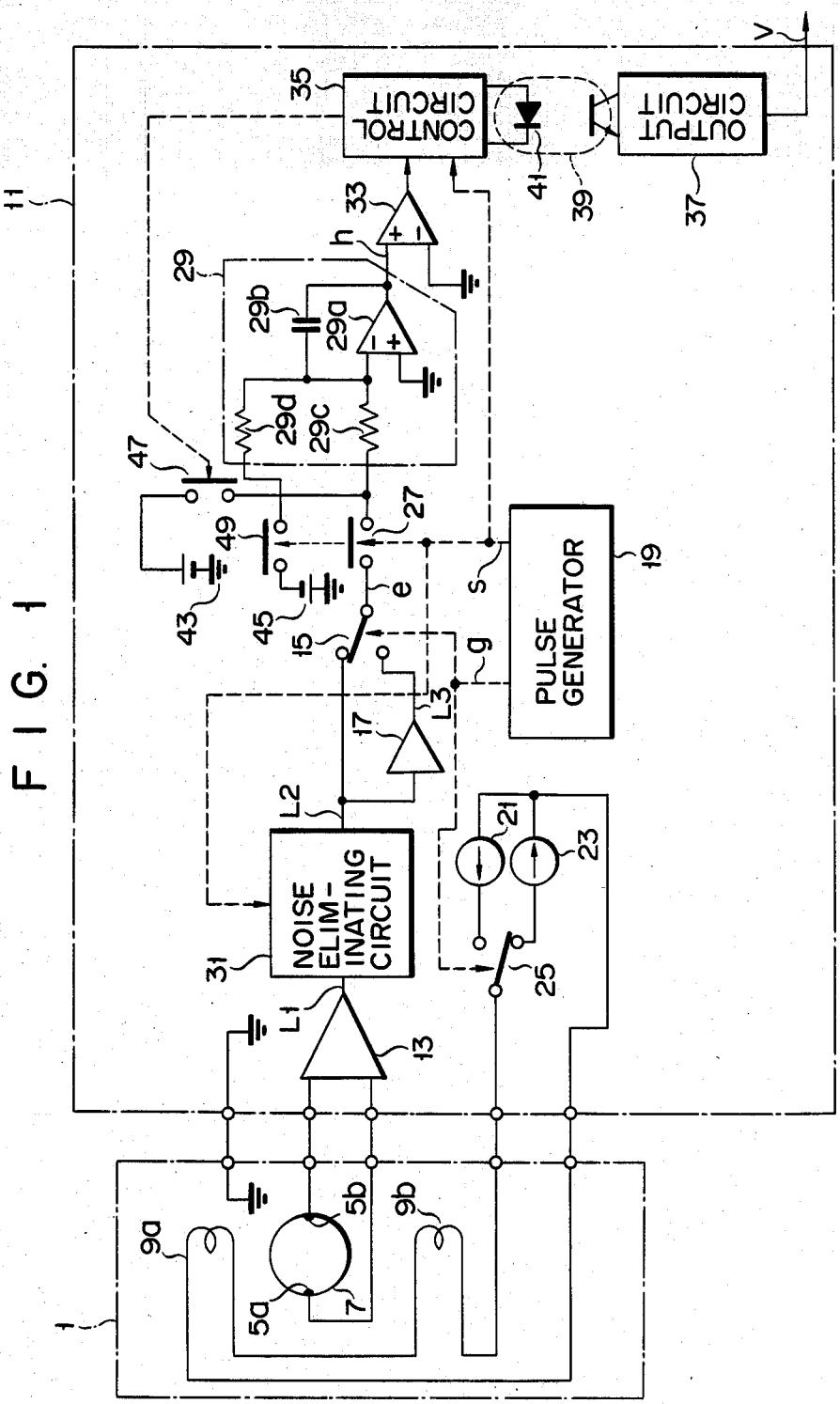
FIG. 1 is a circuit arrangement of an electromagnetic flow meter according to a first embodiment of this invention.
Figure 4A:
FIGS. 4A to 4J indicate signal waveforms by way of describing the operation of the noise-removing circuit of FIG. 2.
Figure 4B:
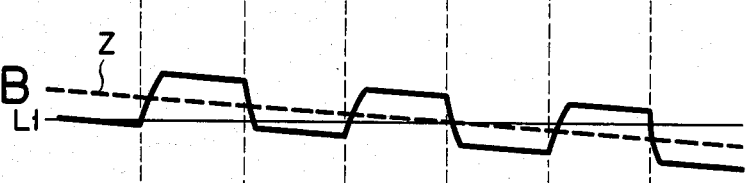
Figure 4C:
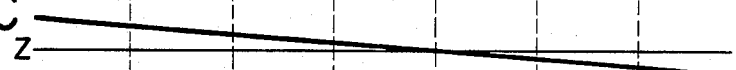
Figure 4D:
Figure 4E:
Figure 4F:
Figure 4G:
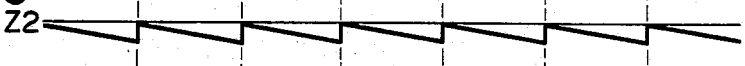
Figure 4H:
Figure 4I:
Figure 4J:
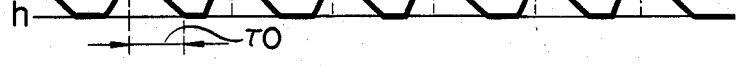

Description may now be made with reference to FIG. 1 and FIG. 4J, inclusive of an electromagnetic flow meter according to a first embodiment.

First, the arrangement of an electromagnetic flow meter embodying this invention is described with reference to FIG. 1. Constant current sources 21, 23 are connected to the excitation coils 9a, 9b of a detector 1 through an excitation changeover switch 25. The changeover switch 25 is shifted from one of the two movable contacts to the other alternately. Thus, a square wave current is supplied to both excitation coils 9a, 9b. A signal denoting the voltage induced between the electrodes 5a, 5b of the pipe 7 of the detector 1 is supplied to the preamplifier 13 of the converter 11. An output signal L1 from the preamplifier 13 is conducted to the noise-eliminating circuit 31. An output signal L2 from the noise-eliminating circuit 31 is supplied to the inversion amplifier 17. The output signal L2 from the noise-eliminating circuit 31, and an output signal L3 from the inversion amplifier 17 are supplied to the changeover switch 15.

A signal e selected by the changeover switch 15 is delivered to an integration circuit 29 through a sampling switch 27. The integration circuit 29 comprises a resistor 29c connected at one end to the sampling switch 27, an operational amplifier 29a whose inverting input terminal is connected to the other end of the resistor 29c, a capacitor 29b connected between the output terminal and inverting input terminal of the amplifier 29a, and a resistor 29d connected at one end to the inverting input terminal of the operational amplifier 29a. The noninverting input terminal of the operational amplifier 29a is connected to a ground level, while the other terminal of the resistor 29d is connected to a switch 49, the other end of which is connected to a reference voltage source 45 which supplies a bias voltage to the integration circuit 29. A switch 47 is connected between a reference voltage source 43 and one end of the resistor 29c. An output signal from the integration circuit 29 is supplied to the noninverting input terminal of a comparator 33, while the inverting input terminal of the comparator 33 is connected to a ground level. The output terminal of the comparator 33 is connected to the control circuit 35. This control circuit 35 sends forth a control signal for turning the reference voltage source switch 47 on or off as the situation demands. While an output signal from the integration circuit 29 is on the decrease, the control circuit 35 causes the photodiode 41 of a photocoupler 39 to emit a light. The output circuit 37 receives an output pulse signal from the control circuit 35 through the photocoupler 39 and then converts the received pulse signal into a DC voltage or a DC current signal V corresponding to the pulse width of the received pulse signal.

A pulse generator 19 issues an excitation signal g to the changeover switches 15, 25 to control their operation. The pulse generator 19 supplies a sampling signal S to the noise-eliminating circuit 31, sampling switches 27 and 49 and control circuit 35, thereby controlling the times by which the switch 27 and control circuit 35 are to be operated. The signals S, g are output at the times illustrated in the later described FIGS. 3A and 3B. A circuit for issuing the signal S may be provided by the already known oscillator and frequency dividing circuit. The signal g can also be easily obtained by dividing the frequency of the signal S by two.

Description may now be made of the noise-eliminating circuit 31 according to a first embodiment of this invention. This noise-eliminating circuit 31 receives the flow rate signal L1 from the preamplifier 13, and the sampling signal S from the pulse generator 19. The noise-eliminating circuit 31 delays the flow rate signal L1 by half the period of the excitation signal g (that is, half the period of the signal L1). The noise-eliminating circuit 31 obtains a difference between the level of the delayed signal and that of the flow rate signal L1 from the preamplifier 13, and eliminates the electrochemical noises.

The noise-eliminating circuit 31 is composed as shown in FIG. 2. A first sample hold circuit 311 receives the sampling signal S from the pulse generator 19. When the sampling signal S is of a high level, the sample hold circuit 311 samples the flow rate signal L1 and outputs an output signal f1 corresponding to the level of the sampled flow rate signal. The output signal f1 from the sample hold circuit 311 is supplied to a second sample hold circuit 313. The second sample hold circuit 313 receives the inverted signal of the sampling signal S which has been inverted by an inverter 315. When the inverted sampling signal $\bar{S}$ is of a high level, the second sample hold circuit 313 samples the signal f1 to issue a signal f2. The output signal f2 from the second sample hold circuit 313 is delivered to the inverting input terminal of a differential amplifier 317, and an output signal L1 from the preamplifier 13 is supplied to the noninverting input terminal of the differential amplifier 317. The differential amplifier 317 obtains the difference between the levels of the received signals and outputs a signal, corresponding to the difference, as the output signal L2 from the noise-eliminating circuit 31.

Description may now be made, with reference to FIGS. 3A to 3F, of the operation of an electromagnetic flow meter arranged as described above. Each time an excitation signal g (FIG. 3A) from the pulse generator 19 changes in level, the connection of the excitation changeover switch 15 is shifted. Consequently, a square wave excitation current flows through the excitation coils 9a, 9b in synchronization with the excitation signal g. Thus, a square wave magnetic field is impressed on a fluid running through the detector pipe 7. As a result, voltage, corresponding to the flow rate (the average of the flow velocity at the pipe 7), is induced between the electrodes 5a, 5b of the aforementioned fluid in accordance with Faraday's law. This induced voltage is supplied to the converter 11. The induced voltage is amplified by the preamplifier 13 and sent forth in the form of the flow rate signal L1 (FIG. 3C). This flow rate signal L1 is delivered to the noise-eliminating circuit 31.

This noise-eliminating circuit 31 is operated as described below. When the sampling signal S (FIG. 3B) is of a high level, the first sample hold circuit 311 samples the flow rate signal L1. Namely, the first sample hold circuit 311 samples the voltage level ES or $-$ES of the flow rate signal L1 issued from the preamplifier 13 immediately before the excitation signal g changes in level. A signal denoting the sampled voltage level is issued as a signal f1. When the inverted sample signal $\bar{S}$ is of a high level, the second sample hold circuit 313 samples the level of the input signal f1 and sends forth a resultant signal as a signal f2 (FIG. 3E). Therefore, the voltage level of the output signal f2 from the second sample hold circuit 313 represents that voltage level ES or $-$ES of the output flow rate signal L1 from the preamplifier 13 which appears immediately before the voltage level of the excitation signal g changes. This means that signal f2 is substantially equal to the flow rate signal L1 which is delayed by half of one cycle.

The flow rate signal L1 is supplied to the non-inverting input terminal of the differential amplifier 317, and the output signal f2 from the second sample hold circuit 313 is conducted to the inverting input terminal of the differential amplifier 317. The amplifier 317 subtracts the signal f2 from the signal L1 and sends forth the resultant signal L2. Consequently, the output signal L2 (FIG. 3F) from the differential amplifier 317 has a level of 2ES or $-$2ES.

Description may now be made of the process by which the noise-eliminating circuit 31 removes noises. Now, let it be assumed that a low frequency noise component Z overlaps the output signal L1 from the preamplifier 13 as shown in FIG. 4B. FIG. 4C illustrates the low frequency noise component Z only. Thus, as shown in FIG. 4D, the flow rate signal f2 issued from the second sample hold circuit 313 indicates the same level as that which the flow rate signal L1 had before the voltage level of the excitation signal g changed. Therefore, the noise component Z1 involved in the flow rate signal f2 shows the same level as that which the noise component Z presented before the voltage level of the excitation signal g varied. As seen from FIG. 4E, therefore, the noise component Z1 included in the flow rate signal f2 presents a stepped pattern. In this case, as shown in FIG. 4F, an output signal L2 from the differential amplifier 317 is of a level equal to a difference between the level of the flow rate signal L1 and that of the signal f2. Therefore, the output signal L2 is of a level deviated neither to the positive side nor to the negative side. The noise component Z2 involved in the signal L2 is of a level arrived at by subtracting the level of the noise component Z1 from that of the noise component Z. Therefore, the greater part of the noise component Z is eliminated and, consequently, as shown in FIG. 4G, the noise component Z2 is constituted by the changing section of the aforesaid noise component Z. The aforementioned operation can eliminate the noise components of a flow rate signal.

The output signal L2 from the noise-eliminating circuit 31, and the inverted output signal L3 (not shown) of the output signal L2 are conducted through the changeover switch 15 and converted into the negative voltage signals e shown in FIG. 4H. The noise component Z3 included in the negative signal e is constituted by the arrangement of alternate positive and negative voltage levels as shown in FIG. 4I.

During the sampling S is of a high level, the sampling switch 27 is closed and the above-mentioned signal e is carried to the integration circuit 29. Therefore, when the aforementioned sampling signal S is of a high level, the integration circuit 29 integrates the signal e. When the sampling signal S is of a low level, the sampling switch 27 is opened. When an output signal from the integration circuit 29 is of a level higher than zero, the comparator 33 issues an high level output signal. While the sampling signal S is of a low level and the output of comparator 33 is of a high level the control circuit 35 causes the switch 47 to close. Therefore, after the sampling signal S falls to a low level, the output signal from the integration circuit 29 is gradually attenuated. As a result, the integration circuit 29 sends forth an output signal h having the waveform shown in FIG. 4J. The attenuation period $\tau 0$ of the output signal h from the integration circuit 29 is expressed as follows.

$$\tau 0 = Es \times T/VR$$

where:
Es = voltage level of the flow rate signal L1
T = sampling time
VR = voltage of the reference voltage source 43

When the comparator 33 sends forth a high level signal and the sampling signal S is of a low level (during attenuation period $\tau 0$), the control circuit 35 causes the photodiode 41 to emit a light. Namely, the control circuit 35 converts the noise free flow rate signal L1 into a pulse signal having a pulse width corresponding to the voltage level of the flow rate signal L1. At this time, the photocoupler 39 is applied in order to electrically isolate the output circuit 37 from the other circuits, thereby reducing the effect of noise.

The output circuit 37 averages the received pulse signal, and issues a signal V having a DC voltage or DC current proportional to the flow rate.

With the converter 11 involved in an electromagnetic flow meter according to a first embodiment of this invention, the noise component Z is substantially removed by the noise-eliminating circuit 31 to present a pattern such as shown in FIG. 4I. Consequently, the effect of electrochemical noises is noticeably excluded.

When the ordinary electromagnetic flow meter is operated under normal conditions, the main component of electrochemical noise has a lower frequency than 1 Hz. In contrast, the excitation signal g has a frequency corresponding to the frequency of a commercial power source divided by an even number; one-eighth, for example, of 50 Hz, or about 6 Hz. An electrochemical noise having a frequency of 1 Hz can be distinguished from a flow rate signal having a frequency of 6 Hz by, for example, an active filter composed of an operational amplifier. Therefore, the above-mentioned electrochemical noises can be excluded by the active filter. However, application of the active filter has drawbacks in that the waveforms are distorted, the phase is shifted and it is impossible to accurately sample a square wave flow rate signal. In other words, the active filter itself gives rise to noises.

In contrast, the converter 11 involved in the electromagnetic flow meter embodying the invention accurately amplifies the flow rate signal L1 and causes electromagnetic noises to be excluded by the noise-eliminating circuit 31. If, therefore, electrochemical noises increase excessively, the greater part thereof is removed, thereby suppressing the occurrence of measurement errors.

Noises are removed particularly in the forward region of the converter 11, thereby enabling the rear circuit elements thereof (the integration circuit 29 and control circuit 35, for example) to have a sufficient noise margin. Consequently, the circuit arrangement of the subject electromagnetic flow meter is simplified, thereby ensuring accurate flow rate determination of the subject device. The above-mentioned noise-eliminating circuit 31 can exclude not only electrochemical noises, but also noises of any kind, provided they are of a low frequency.

Reference may now be made to the noise components Z2 which can not be removed by the noise-eliminating circuit 31. As shown in FIG. 4I, the noise components Z2 are sent forth through the polarity changeover switch 15 alternately on the positive and negative voltage sides. When, therefore, the pulse signals are averaged in the output circuit 37, the noise component Z2 which corresponds to one period is offset. If, therefore, the noise varies at a constant rate during one period in the signal g, any noise, though not of a low frequency, can be reliably eliminated.

Description may now be made, with reference to FIGS. 5 to 6F, of a noise-eliminating circuit 31 according to a second embodiment of this invention. One of the leads of a first capacitor 71 is connected to the output terminal of the aforementioned preamplifier 13 through a first switching element 73. The second capacitor 75 is connected to the aforesaid preamplifier 13 through a second switching element 77. The other leads of both the first and second capacitors 71, 75 are grounded. The one lead of the first capacitor 71 is connected to the inverting input terminal of a differential amplifier 81 through a third switching element 79, while the one lead of the second capacitor 75 is connected, through a fourth switching element 83, to the inverting input terminal of the differential amplifier 81. The output terminal of the preamplifier 13 is connected to the noninverting input terminal of the differential amplifier 81.

The first to the fourth switching elements 73, 77, 79, 83 are each constituted by, for example, a semiconductor switch. These switching elements 73, 77, 79, 83 are supplied with the aforementioned excitation signal g for the changeover of the switch operation. The first and fourth switching elements 73, 83 are closed when the excitation signal g is of a high level, and opened when said excitation signal g is of a low level. The second and third switching elements 77, 79 are closed when the excitation signal g is of a low level, and opened when the excitation signal g is of a high level.

Description may now be made of the operation of the noise-eliminating circuit 31 arranged as described above. When supplied with the excitation signal g (FIG. 6A), the first and fourth switching elements 73, 83 are respectively opened and closed in the timing shown in FIG. 6B, and the second and third switching elements 77, 79 are respectively opened and closed in the timing illustrated in FIG. 6C. When therefore, the excitation signal g is of a high level, the current of the flow rate signal L1 output from the preamplifier 13 is charged in the first capacitor 71. At this time the voltage charged in the second capacitor 75 is supplied to the differential amplifier 81. When the excitation signal g is of a low level, the current of the flow rate signal L1 is also charged in the second capacitor 75. At this time the voltage charged in the first capacitor 71 is conducted to the differential amplifier 81. As a result, a signal m1, delivered to the noninverting input terminal of the differential amplifier 81, takes the pattern indicated in FIG. 6E. As a result, the differential amplifier 81 issues a signal L2 corresponding to a difference between the level of the flow rate signal L1 and that of the signal m1 delayed by half the period of the flow rate signal L1.

The noise-eliminating circuit 31 arranged as described above attains the same effect as the noise-eliminating circuit of FIG. 2, involving the sampling circuit. Further, the noise-eliminating circuit 31, composed of two capacitors and four switching elements, has a simple arrangement and is relatively inexpensive.

Description may now be made, with reference to FIG. 7 and FIG. 8F, of a noise-eliminating circuit 31 according to a third embodiment of this invention.

One lead of a first capacitor 91 is connected to the output terminal of the preamplifier 13 through a first switching element 93, and grounded through a second switching element 95. The other lead of the first capacitor 91 is grounded through a third switching element 97, and also connected to the input terminal of a buffer amplifier 101 through a fourth switching element 99. One lead of a second capacitor 103 is connected to the output terminal of the preamplifier 13 through a fifth switching element 105, and grounded through a sixth switching element 107. The other lead of the second capacitor 103 is grounded through a seventh switching element 109, and also connected to the input terminal of the buffer amplifier 101 through an eighth switching element 111. The output terminal of the preamplifier 13 and that of the buffer amplifier 101 are connected to the input terminals of an adder 113.

This adder 113 may be of an ordinary type, namely, may be constituted by, for example, an operational amplifier 115 and resistors 117, 119, 121.

The switching elements are supplied with the excitation signal g. The first, third, sixth and eighth switching elements 93, 97, 107, 111 are closed when the excitation signal g is of a high level, and opened when the excitation signal g is of a low level. The second, fourth, fifth and seventh switching elements 95, 99, 105, 109 are closed when the excitation signal g is of a low level, and opened when the excitation signal g is of a high level.

Description may now be made of the operation of the noise-eliminating circuit 31 according to the third embodiment of the invention. When the excitation signal g is of a high level, the switching element 93 is closed and the first capacitor is charged by the current of the flow rate signal L1. At this time, the other lead of the first capacitor 91 is grounded. When the excitation signal g is of a low level, the switching elements 93, 97 are opened and the switching element 95 is closed. As a result, one lead of the first capacitor 91 is grounded, and the voltage charged in the first capacitor 91 is inversed in polarity. The polarity-inversed voltage is supplied to the input terminal of the buffer amplifier 101. The operation, the same as described above, is repeated with respect to the second capacitor group.

Now, let it be assumed that the flow rate signal L1 has its level varied as shown in FIG. 8B. Then, a signal V1 at one of the leads of the first capacitor is indicative of the pattern shown in FIG. 8C. A signal V2 at one of the leads of the second capacitor reveals the pattern given in FIG. 8D. The level inverted signals V1, V2 are supplied alternately to the buffer amplifier 101. As a result, an output signal m2 from the buffer amplifier 101 presents the pattern given in FIG. 8E. The flow rate signal L1 and the signal m2 are added together in the adder 113. As a result, the adder 113 outputs an output signal L2 illustrated in FIG. 8F.

The noise-eliminating circuit 31 arranged as mentioned above can exclude low frequency noises in the same manner as the first embodiment. The noise-eliminating circuit 31 according to the third embodiment has a simpler arrangement than the noise-eliminating circuit involving a differential amplifier such as given in FIGS. 2 and 5. The installation of a differential amplification circuit required at least two operational amplifiers and four precision resistors. In contrast, the noise-eliminating circuit 31 according to the third embodiment requires only one operational amplifier, though it must be provided with eight switching elements. Consequently, the subject noise-eliminating circuit 31 has a simpler arrangement and is less expensive.

With the aforementioned noise-eliminating circuit, the square wave flow rate signal L1 has its level sampled before the level changes. After the level change of the flow rate signal L1, a signal is issued which is of a level corresponding to the sampled value, thereby generating a signal delayed by half the period of the flow rate signal L1. However, this invention is not limited to the above-described embodiment. For instance, it is possible to directly delay an analog signal by applying an analog-delaying circuit 131 as shown in FIG. 9. If a differential amplifier 133 is applied to determine a difference between the level of the delayed signal and that of an input signal, low frequency noises can be eliminated in the same manner as the noise-eliminating circuit according to the above-described embodiment. The analog-delaying circuit may be provided, for example, by a charge coupled device (CCD) or a bucket brigade device (BBD).

In the foregoing embodiment, the flow rate signal L1 was delayed by half its period. However, this invention is not limited to this process. For instance, it is possible to delay the flow rate signal L1 by an odd number multiple of the half period thereof and to determine a difference between the level of the delayed signal and the flow rate signal L1. In this case, too, the noises of the flow rate signal L1 and those of the delayed signal are offset.

In the aforementioned embodiment, the flow rate signal L2 was determined from a difference between the level of the flow rate signal L1 and that of its delayed signal. However, this invention is not limited to this process. Namely, it is possible to take the following steps. Endeavour to delay the flow rate signal L1 by a one and a half period, delay the flow rate signal L1 by one period, and issue a first signal corresponding to a difference between the levels of both delayed flow rate signals. Further, the flow rate signal L1 is delayed by half the period and a difference between the level of the half period delayed signal and that of the flow rate signal L1 is determined as a second signal. The levels of the first and second flow rate signals is averaged so as to finally determine the true flow rate of a fluid from a signal denoting the averaged signal level. In addition, the arrangement for delaying the flow rate signal L1 by an integral number of times its half period can be easily provided by adding, for example, the sample hold circuit shown in FIG. 5.

What is claimed is:

1. An electromagnetic flow meter comprising:
a flow meter main body which supplies a square wave excitation current to at least one excitation coil, impresses the resultant magnetic field on an electrically conductive fluid, and draws out the voltage induced in said electrically conductive fluid as a flow rate signal by means of at least one paired electrodes;
delay means which is connected to said flow meter main body to receive said flow rate signal, delay said flow rate signal by an integer multiple of half the period of said flow rate signal and output a delayed signal;
noise-eliminating means which is connected to said flow meter main body and said delay means, receives said flow rate signal and said delayed signal, eliminates the low frequency noise component included in said flow rate signal based on said delayed signal, and output a corresponding signal corresponding to said flow rate signal which has been freed of said noise component; and
means which is connected to said noise-eliminating means and determines the flow rate of said electrically conductive fluid from the level of the corresponding signal.

2. The electromagnetic flow meter according to claim 1, wherein said delay means delay said flow rate signal by an odd number multiple of half the period of said flow rate signal.

3. The electromagnetic flow meter according to claim 1, wherein said delay means delay said flow rate signal by half the period of said flow rate signal.

4. The electromagnetic flow meter according to claim 2, wherein said noise-eliminating means determines a difference between the level of a delayed signal output from said delay means and that of said flow rate signal, and outputs said corresponding signal corresponding to said difference.

5. The electromagnetic flow meter according to claim 3, wherein said noise-eliminating means determines a difference between the level of a delayed signal output from said delay means and that of said flow rate signal, and outputs said corresponding signal corresponding to said difference.

6. The electromagnetic flow meter according to claim 1, wherein said delay means constitute at least one sample hold circuit which samples said flow rate signal and, after the level of said square wave excitation current changes, outputs, in the form of said delayed signal, a signal corresponding to the sampled value.

7. The electromagnetic flow meter according to claim 1, wherein said delay means are provided with at least one capacitor which acts to store the level of said flow rate signal for only half the period of said square wave excitation current, in synchronization with the shifting level of said square wave excitation current from high to low, or vice versa.

8. The electromagnetic flow meter according to claim 6, wherein said noise-eliminating means comprises:
means for inversing the polarity of the voltage charged in said capacitor; and
means which adds the levels of the output voltages from said voltage polarity-inversing means to the level of said flow rate signal, and outputs a signal having a level corresponding to the sum of said addition.

9. The electromagnetic flow meter according to claim 1, wherein said means for determining the flow rate comprises:
means for converting said corresponding signal output from said noise-eliminating means to a pulse signal whose pulse width corresponds to the voltage level of said corresponding signal; and
means for smoothing said pulse signal from said pulse converting means to determine the flow rate.

10. The electromagnetic flow meter according to claim 1, wherein said delay means is constituted by a bucket brigade device (BBD) which is supplied with the flow rate signal and delays said received flow rate signal by half the period of said flow rate signal.

11. The electromagnetic flow meter according to claim 1, wherein said delay means is constituted by the charge coupled device (CCD) which is supplied with the flow rate signal and delays said flow rate signal by half the period of said flow rate signal.

12. An electromagnetic flow meter comprising:
a flow meter main body which supplies a square wave excitation current to at least one excitation coil, impresses the resultant magnetic field on an electrically conductive fluid, and draws out the voltage induced in said electrically conductive fluid as a flow rate signal by means of at least one pair of electrodes;
delay means which is connected to said flow meter main body, receives the flow rate signal, and delays the flow rate signal by an odd number multiple of half the period of the flow rate signal;
noise-eliminating means which is connected to said flow meter main body and delay means, receives said flow rate signal and delayed signal, offsets the level of the low frequency noise component included in said flow rate signal against that of the low frequency noise component of the delayed signal, and outputs a corresponding signal having a level corresponding to that of the flow rate signal freed of the low frequency noise component; and
means which is connected to said noise-eliminating means to determine the flow rate of the electrically conductive fluid from the level of the corresponding signal.

13. The electromagnetic flow meter according to claim 12, wherein said noise-eliminating means determines a difference between the level of said flow rate signal and that of the delayed signal, and outputs a signal having a level corresponding to said difference as the corresponding signal.

14. The electromagnetic flow meter according to claim 12, wherein said delay means delays the flow rate signal by half the period of the flow rate signal.

15. The electromagnetic flow meter according to claim 12, wherein said delay means is constituted by a sample hold circuit which samples the level of the flow rate signal and outputs the sampled signal as the delayed signal.

* * * * *